United States Patent [19]
Park

[11] Patent Number: 5,799,611
[45] Date of Patent: Sep. 1, 1998

[54] MODULAR ANIMAL HABITAT

[76] Inventor: Hong Ku Park, 203 Southcrest Dr., Huntsville, Ala. 35802

[21] Appl. No.: 805,884

[22] Filed: Mar. 3, 1997

[51] Int. Cl.[6] .................................. A01K 1/00
[52] U.S. Cl. .................. 119/248; 119/421; 119/702
[58] Field of Search .......................... 119/248, 417, 119/421, 452, 475, 701, 702, 707

[56] References Cited

U.S. PATENT DOCUMENTS

| | | | |
|---|---|---|---|
| D. 231,371 | 4/1974 | Willinger et al. | D30/42 |
| D. 232,036 | 7/1974 | Willinger et al. | 119/452 X |
| 3,653,357 | 4/1972 | Sheidlower et al. | 119/421 X |
| 3,687,110 | 8/1972 | Braunhut | 119/421 X |
| 3,791,346 | 2/1974 | Willinger et al. | 119/452 |
| 3,994,262 | 11/1976 | Suchowski et al. | 119/452 X |
| 5,092,269 | 3/1992 | Phillips et al. | 119/452 |
| 5,186,122 | 2/1993 | Phillips et al. | 119/452 |
| 5,664,524 | 9/1997 | Piglia et al. | 119/452 |
| 5,664,525 | 9/1997 | Phillips et al. | 119/452 |

Primary Examiner—Michael J. Carone
Assistant Examiner—Yvonne R. Abbott
Attorney, Agent, or Firm—John C. Garvin, Jr.

[57] ABSTRACT

An animal habitat for housing animals which allows the animals to move between two or more modules or chambers. The animal habitat comprises a plurality of lower tier modules having passageways therebetween for allowing animals to move from a lower tier module to an adjacent lower tier module and a plurality of upper tier modules having passageways therebetween for allowing animals to move from one upper tier module to an adjacent upper tier module.

23 Claims, 6 Drawing Sheets

MODULAR ANIMAL HABITAT

FIELD OF THE INVENTION

This invention relates generally to a modular animal habitat, and more particularly to a modular animal habitat for housing one or more species of animals and which has passageways for allowing the animals housed therein to move between the modules making up the habitat.

BACKGROUND OF THE INVENTION

The present invention relates to a novel modular habitat for animals comprising a plurality of spaced modules for housing animals therein and allowing them to move between two or more spaced modules.

Aquariums and other animal habitats have long been used in homes, schools, offices, and the like, both for their decorative and ornamental functions, and for providing means whereby various types of animals such as fish, frogs, iguanas, rodents, ants and the like may be viewed swimming, moving, feeding and engaging in other activities which are both educational and interesting to watch. The characteristics and tendencies of specific animals can be of extreme interest and educational value as the animals grow, and when viewed at periodic intervals.

While the prior art encompasses numerous aquariums or the like having a plurality of independent or spaced tanks for housing fish, such devices have numerous defects and disadvantages which are obviated by the present invention. The following U.S. patents are exemplary of such prior art devices: U.S. Pat. No. 192,595 (Palen et al.); U.S. Pat. No. 1,576,462 (Polzin); U.S. Pat. No. 2,059,927 (Beck); U.S. Pat. No. 3,903,844 (Greenia); U.S. Pat. No. 3,921,583 (De Shores); U.S. Pat. No. 3,991,715 (Gibson); U.S. Pat. No. 5,067,439 (Hand); U.S. Pat. No. 5,083,528 (Strong); and U.S. Pat. No. 5,357,903 (Rivera).

Each of the Palen et al, Polzin, Beck, Greenia and Gibson patents discloses an aquarium having two spaced tanks or reservoirs and an arched shaped bridge connecting the tanks or reservoirs which allow fish to swim between the spaced tanks or reservoirs. The De Shores patent discloses an aquarium arrangement having two or more spaced tanks interconnected by one or more passageway tubes which allow fish to swim between the spaced tanks. The Strong patent discloses an aquarium comprising a plurality of spaced tanks in stepped, gradually descending, relation whereby water introduced to the uppermost tank flows therethrough and then down into and through each succeeding tank with means for causing the flow of water from one tank to the next. The Rivera patent discloses a submerged terrarium for an aquarium for allowing terrestrial (air breathing) animals to live underneath the water level of the aquarium which contains aquatic (water breathing) animals.

SUMMARY OF THE INVENTION

In accordance with the present invention a modular animal habitat is provided which allows animals housed therein to move between two or more modules or chambers. The modular animal habitat is adapted to be supported by a rack or support that may be mounted on a wall of a room or on a table or the like.

The modular animal habitat is generally comprised of a plurality of lower tier modules having passageways therebetween for allowing animals to move from a lower tier module to an adjacent lower tier module and a plurality of upper tier modules having passageways therebetween for allowing animals to move from one upper tier module to an adjacent upper tier module. However, it is to be understood that the animal habitat of the present invention could be comprised of a plurality of modules in a one tier arrangement.

Accordingly, it is an object of the present invention to provide an improved modular animal habitat which allows animals housed therein to move from one module to one or more adjacent or contiguous modules.

It is another object of the present invention to provide an improved animal habitat having a plurality of lower tier modules and a plurality of upper tier modules and passageways for allowing animals to move horizontally or vertically between at least two adjacent or contiguous modules of a common tier of modules.

It is a further object of the present invention to provide an improved modular animal habitat which is simple and inexpensive in construction and capable of housing both aquatic and terrestrial animals.

These objects as well as other objects, advantages and features of the present invention will become more readily apparent from the following specification when taken in conjunction with the accompanying drawings.

DETAILED DESCRIPTION OF THE PREFERRED EMBODIMENTS

Figure 1:
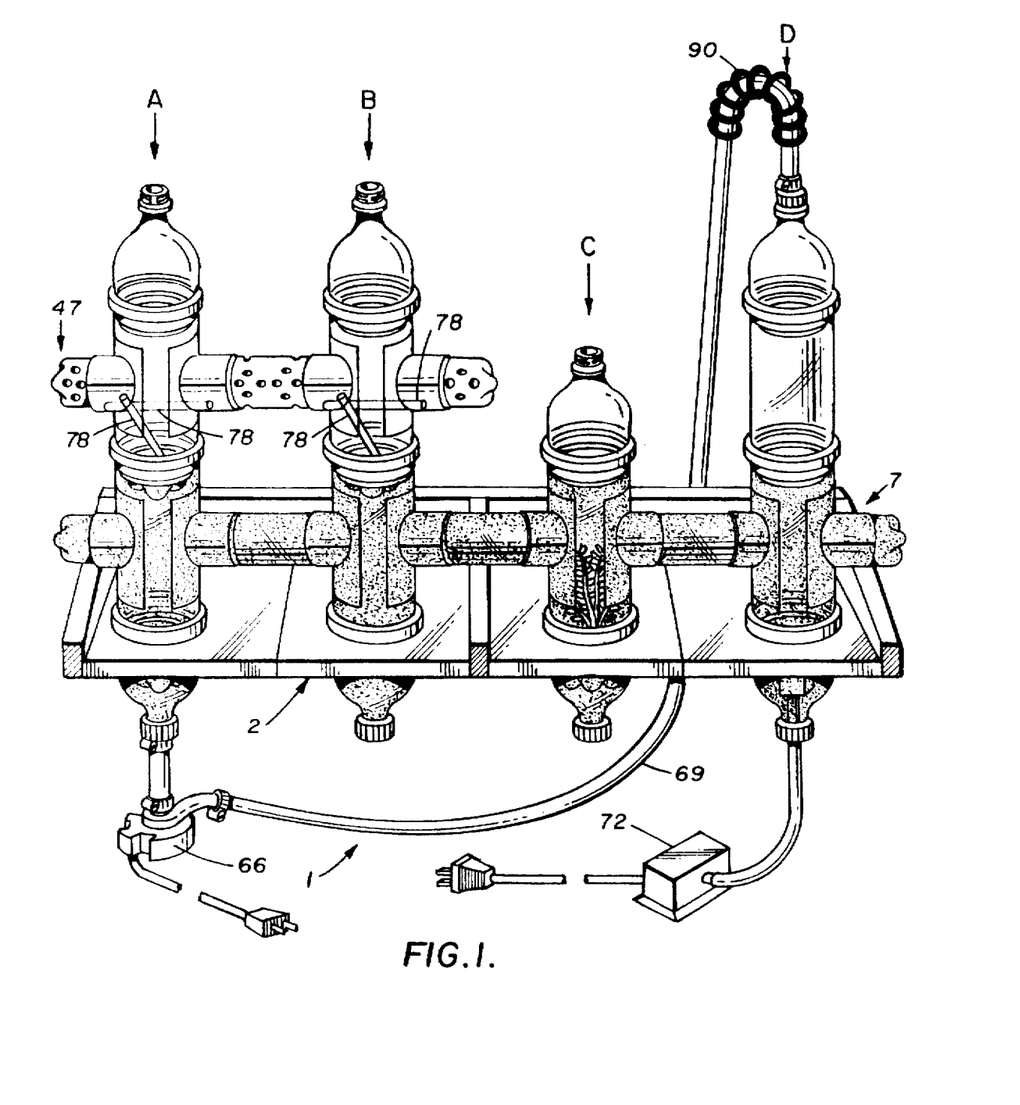
FIG. 1 is a front elevational view of the first embodiment of the modular animal habitat of the present invention.
Figure 2:
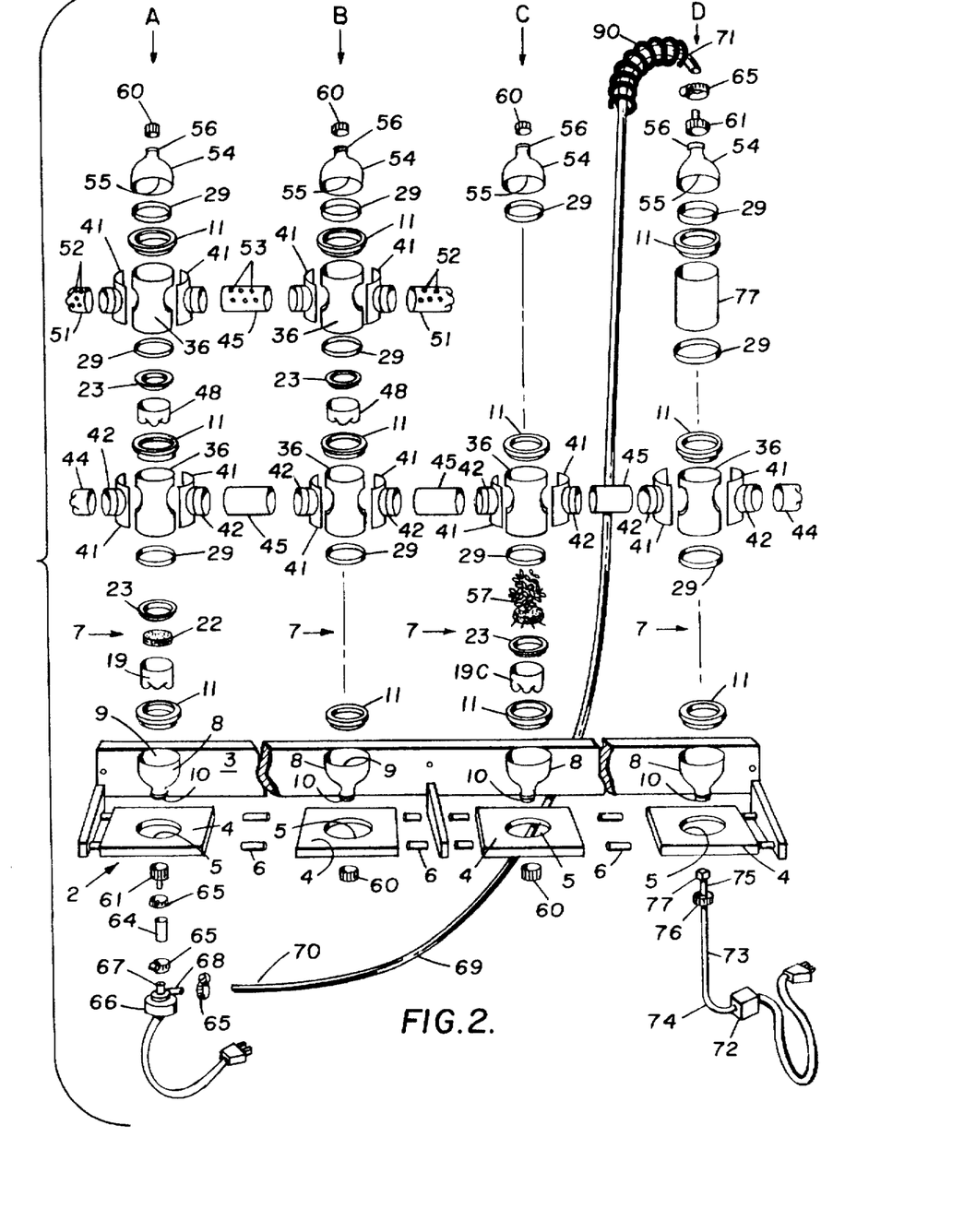
FIG. 2 is a front elevational, exploded, view of the embodiment of the modular animal habitat of FIG. 1.

Referring now to the drawings, particularly FIG. 1 thereof, reference numeral 1 generally designates the first preferred embodiment of the modular animal habitat of the present invention. Referring now to FIGS. 1 and 2, modular animal habitat 1 generally comprises a rack or support 2, a plurality of lower tier modules 7, a plurality of upper tier modules 47; the lower tier modules 7 and the upper tier modules 47, as shown, being arranged in four vertical columns A, B, C and D; a water circulation pump 66, and an oxygen pump 72.

As best shown in FIG. 2, rack or support 2 includes a vertical back 3, a horizontal floor comprised of four sections 4, an opening 5 in each section 4 of horizontal floor, and a plurality of dowel pins 6 for engaging openings (not shown) in the edges of the sections 4 of the floor for securing and connecting the sections 4 of the floor.

Figure 3:
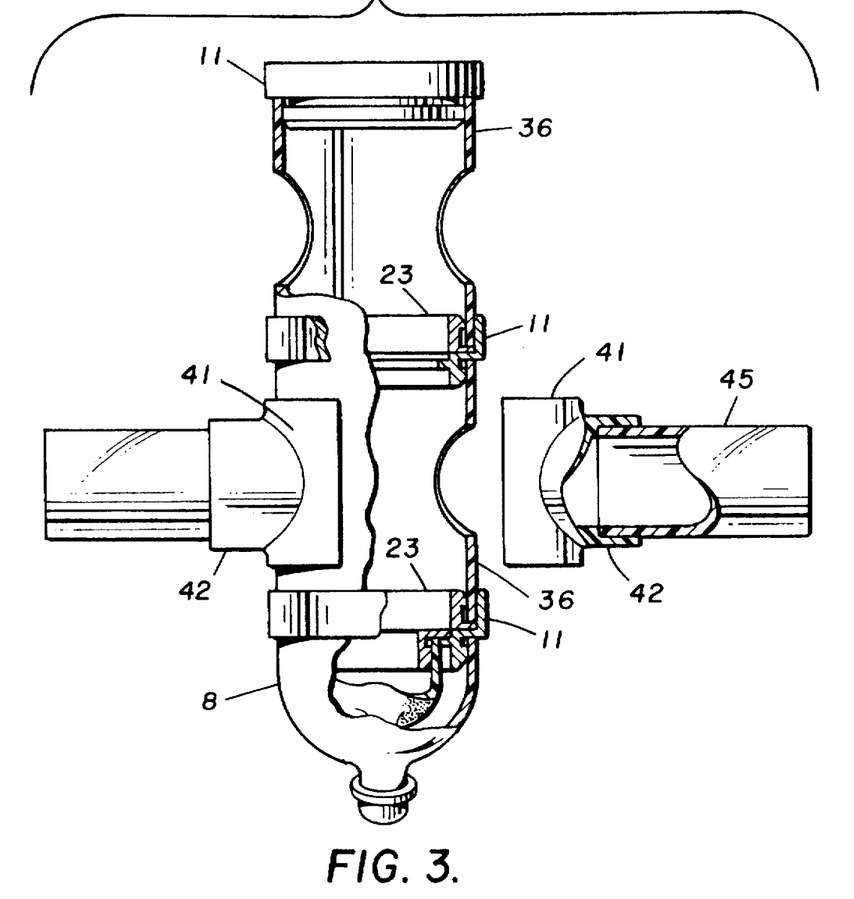
FIG. 3 is a front elevational, partially broken away, sectional, view showing the details of a lower tier module and a portion of an upper tier module of the first embodiment of the modular animal habitat of FIG. 1.
Figure 4:
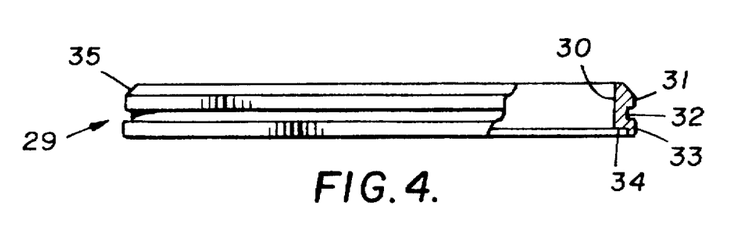
FIG. 4 is a front elevational view, partially broken away, and in section, showing the details of the reinforcing ring.
Figure 5:
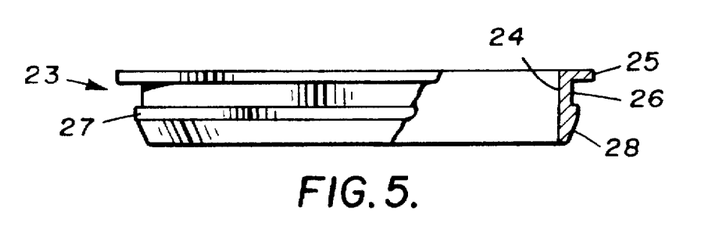
FIG. 5 is a front elevational view, partially broken away, and in section, showing the details of the support collar or sleeve.
Figure 6:
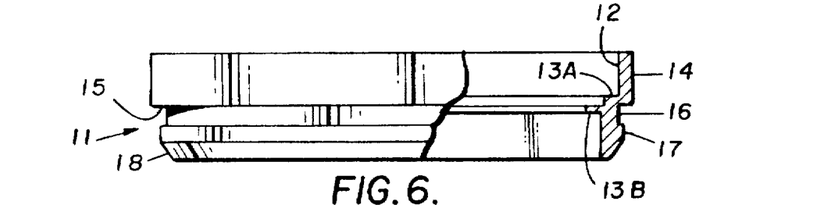
FIG. 6 is a front elevational view, partially broken away, showing the details of the connecting ring.
Figure 7:
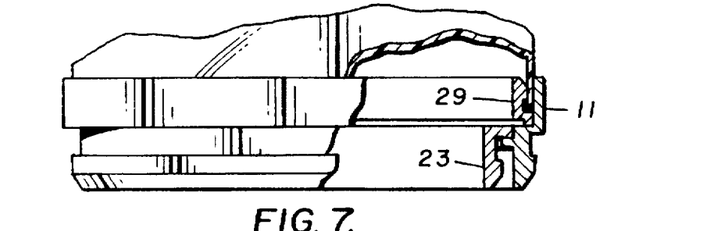
FIG. 7 is a front elevational view, partially broken away and in section, showing the mating of the support collar or sleeve, the connecting ring, the reinforcing ring, and the vertical main chamber.
Figure 9:
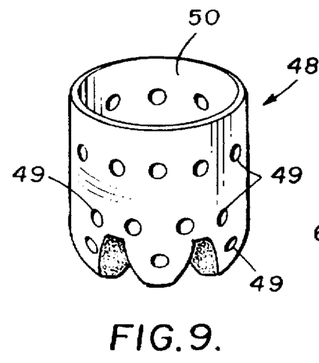
FIG. 9 is a perspective view of an upper cup.
Figure 10:
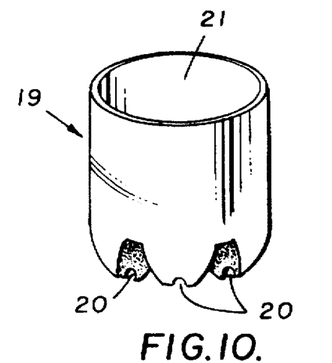
FIG. 10 is a perspective view of a lower cup.

As best seen in FIGS. 1–3, the lower tier module 7 in column A includes a lower section 8 having an upper opening 9, and an externally threaded lower opening 10; a first collar or connecting ring 11 (FIG. 6) including a central opening 12, a first internal annular shoulder 13A, a second internal annular shoulder 13B, an upper annular portion 14, a shoulder 15, an external annular groove 16, a lower annular portion 17, and a lower tapered portion 18; a reinforcing ring 29 (FIG. 4) including a central opening 30, an upper annular portion 31, an annular external groove 32, a lower annular portion 33, an internal shoulder 34, and an upper tapered portion 35; a vertical main chamber 36 (FIG. 8) including a lower section 37, an upper section 38, an internal opening 39, and a pair of side openings 40; and a second collar or connecting ring 11 (FIGS. 2 and 6). As best shown in FIGS. 2 and 10, the lower tier module 7 in column A further includes a lower cup 19 including a plurality of openings 20 in its bottom, and an opening 21 in its upper end; a sponge 22; and an upper cup 48 (FIGS. 2 and 9) including a plurality of openings 49 in its side walls, and an upper opening 50. As best seen in FIG. 2, the lower tier module 7 in column B includes a lower section 8 having an upper opening 9, and an externally threaded lower opening 10; a first collar or connecting ring 11 (FIG. 6) including a central opening 12, a first internal annular shoulder 13A, a second internal annular shoulder 13B, an upper annular portion 14, a shoulder 15, an external annular groove 16, a lower annular portion 17, and a lower tapered portion 18; a reinforcing ring 29 (FIG. 4) including a central opening 30, an upper annular portion 31, an annular external groove 32, a lower annular portion 33, an internal shoulder 34, and an upper tapered portion 35; a vertical main chamber 36 (FIG. 8) including a lower section 37, an upper section 38, an internal opening 39, and a pair of side openings 40; and a second collar or connecting ring 11 (FIGS. 2 and 6). As best shown in FIGS. 2 and 10, the lower tier module 7 in column B further includes an upper cup 48 (FIGS. 2 and 9) including a plurality of openings 49 in its side walls, and an upper opening 50. As best seen in FIGS. 2 and 10, the lower tier module 7 in column C includes a lower section 8 having an upper opening 9, and an externally threaded lower opening 10; a collar or connecting ring 11 (FIG. 6) including a central opening 12, a first internal annular shoulder 13A, a second internal annular shoulder 13B, an upper annular portion 14, a shoulder 15, an external annular groove 16, a lower annular portion 17, and a lower tapered portion 18; a reinforcing ring 29 (FIG. 4) including a central opening 30, an upper annular portion 31, an annular external groove 32, a lower annular portion 33, an internal shoulder 34, and an upper tapered portion 35; a vertical main chamber 36 (FIG. 8) including a lower section 37, an upper section 38, an internal opening 39, and a pair of side openings 40; and a second collar or connecting ring 11 (FIGS. 2 and 6). As best shown in FIGS. 2 and 10, the lower tier module 7 in column C further includes a lower cup 19C including a plurality of openings 20 in its bottom, and an opening 21 in its upper end; a second reinforcing ring 29 having the structure depicted in FIG. 4; a cover or dome 54 including a lower opening 55, an externally threaded upper opening 56; and an internally threaded cap 60; an artificial plant 57; and a cup supporting insert 23 (FIG. 5), including a central opening 24, an upper annular protrusion 25, an external annular groove 26, an external annular raised portion 27, and an external tapered portion 28.

As best seen in FIG. 2, the lower tier module 7 in column D includes a lower section 8 having an upper opening 9, and an externally threaded lower opening 10; a first collar or connecting ring 11 (FIG. 6) including a central opening 12, a first internal annular shoulder 13A, a second internal annular shoulder 13B, an upper annular portion 14, a shoulder 15, an external annular groove 16, a lower annular portion 17, and a lower tapered portion 18; a reinforcing ring 29 (FIG. 4) including a central opening 30, an upper annular portion 31, an annular external groove 32, a lower annular portion 33, an internal shoulder 34, and an upper tapered portion 35; a vertical main chamber 36 (FIG. 8) including a lower section 37, an upper section 38, an internal opening 39, and a pair of side openings 40; and a second collar or connecting ring 11 (FIGS. 2 and 6).

Figure 8:
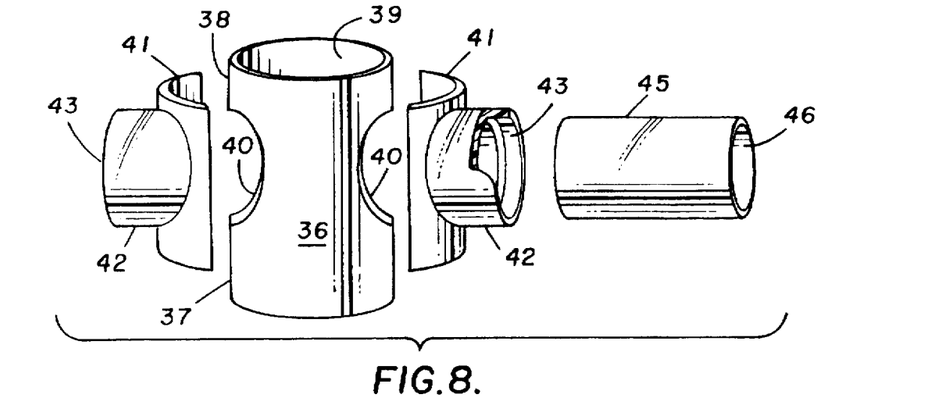
FIG. 8 is a front elevational, exploded, view showing the details of a vertical main chamber, two vertical connection members, and a horizontal connection member.

As best seen in FIGS. 2, 3 and 8, each lower tier module 7 further includes a pair of generally arcuate-shaped vertical connection members 41, each including a horizontally extending element 42 (FIG. 8) having an internal opening 43 extending therethrough; an end cap 44 in each of columns A and D; a horizontal, hollow, connection member 45 for connecting adjacent vertical connection members 41 between columns A and B, columns B and C, and columns C and D.

As best shown in FIGS. 1 and 2, each upper tier module 47 in columns A and B includes a cup supporting insert 23 (FIG. 5); a pair of reinforcing rings 29; a vertical main chamber 36; a pair of vertical connection members 41; a collar or connecting ring 11; and a cover or dome 54 including a lower opening 55, and an externally threaded upper opening 56; and an internally threaded cap 60. The upper tier module 47 in column A has an end cap 51 having a plurality of openings 52 in its upper surface in communication with a vertical connection member 41. A horizontal connection member 45 having a plurality of openings 53 in its upper surface connects adjacent vertical connection members 41 of columns A and B. An end cap 51 having a plurality of openings 52 in its upper surface is in communication with the horizontally extending element 42 of the outermost vertical connection member 41 in column A. The opening 52 in each end cap 51 and the openings 53 in horizontal connection member 45 are for allowing air to enter components in columns A and B for breathing by the animals housed therein.

Figure 11:
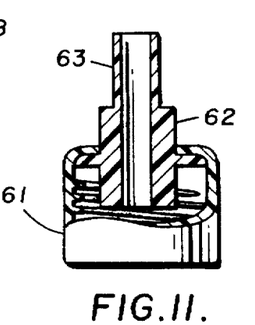
FIG. 11 is a front elevational view, partially broken away, and in section, showing the details of an internally threaded cap and its associated hollow tube.

As best shown in FIGS. 1 and 2, the upper tier module 47 in column D further includes a hollow vertical main chamber 77; two reinforcing rings 29; a collar or connecting ring 11; and a cover or dome 54 having a lower opening 55 and an externally threaded upper opening 56; and an internally threaded cap 61 (FIG. 11) including a first hollow tube 62 having a reduced portion 63 provided to be mounted on the externally threaded opening 56 of cover or dome 54 in column D. A second internally threaded cap 61 (FIG. 11) including a first hollow tube 62 having a reduced portion 63 is provided for connection to the externally threaded lower opening 10 of lower section 8 of the lower tier module 7 of column A.

A water circulation pump 66 (FIGS. 1 and 2) having an intake tube 67 is provided for connection to the reduced portion 63 of first hollow tube 62 of internally threaded cap 61 in column A by way of a second hollow tube 64 and two clamps 65. Water circulation pump 66 includes an output tube 68 for connection to the first end 70 of a hose 69 by a clamp 65. A water circulation pump corresponding to pump 66 shown in the drawing and described herein is available from Aquarium Systems, 8141 Tyler Blvd, Mentor Ohio under the trade designation MINI-JET 404, Catalog No. MN-404. Hose 69 has a second end 71 for securement to the reduced portion 63 of hollow tube 62 of the internally threaded cap 61 in column D by means of a clamp 65. A spring 90 is mounted over second end 71 of hose 69 to hold the shape (bend) of the hose 69 near its end 71 and preventing a possible kink.

An electrical oxygen pump 72 (FIGS. 1 and 2) is provided for pumping oxygen into the lower tier module 7 in column D through hollow hose 73 having first end 74 and second end 75, a gasket 77 connected to the second end 75 of hose 73 and an internally threaded cap 76 with a central opening slidably mounted on hose 73. An oxygen pump corresponding to pump 72 shown in the drawing and described herein is available from Willinger Brothers, Inc., Oakland, N. J., under the trade designation Second Nature Whisper 100 115 Volts. As best shown in FIG. 1, a stick, small log or the like 78 is placed at an angle in each of upper tier modules 47 of columns A and B to allow animals housed in such upper tier modules 47 to walk or move upon same to drink water from a respective cup 48. Also, as best shown in FIG. 1, a stick, small log or the like 78 is placed generally horizontally in each of the upper tier modules 47 of columns A and B to allow animals housed therein to move within same.

The rack or support 2, the lower tier modules 7, and the upper tier modules 47 of the first embodiment habitat 1 as shown in the exploded view of FIG. 2 are assembled to the condition shown in FIG. 1 by moving the adjacent elements toward each other and secured by any suitable conventional means such as friction, adhesives or the like. After the rack 2, the lower tier modules 7, and the upper tier modules 47 are assembled and secured, the internally threaded caps 60 are screwed over respective externally threaded upper openings 56 of cover or dome 54 in columns A, B and C and internally threaded caps 60 are screwed over respective externally threaded lower openings 10 of lower section 8 of lower tier modules 7 in columns B and C.

The internally threaded cap 61 in column A is next tightly screwed over the externally threaded opening 10 of lower section 8 of lower tier module 7 with the reduced portion 63 (FIG. 11) of hollow tube 62 extending downwardly. One end of the tube 64 is next telescoped over the reduced portion 63 and secured thereto by a clamp 65. The intake tube 67 of water circulation pump 66 is then telescoped within the free end of tube 64 and secured thereto by a clamp 65. The first end 70 of hose 69 is then telescoped over the output tube 68 of water circulation pump 66 and secured thereto by a clamp 65. The hollow hose 73 in communication with oxygen pump 72 is next secured in communication with the lower section 8 of lower tier module 7 in column D by screwing the internally threaded cap 76 over the externally threaded opening 10 and tightly engaging the gasket 76 to seal the connection. Water is then introduced through the opening 56 of cover or dome 54 in either of columns C or D until the water level in all lower tier modules 7 is at a point slightly below the second lowermost collar or connecting ring 11 in all lower tier modules 7 as shown in FIG. 1. The second end 71 of hose 69 with spring 90 mounted thereon is next secured to the reduced portion 63 of tube 62 associated with the internally threaded cap 61 in column D by a clamp 65. To insert aquatic animals such as the many varieties of fish into the water in each of the lower tier modules 7, the cover or dome 54 in column C is removed from the uppermost collar or connecting ring 11 and placed into the lower tier module 7 in column C, at which time the animals are free to move (swim) between all of the lower tier modules 7. Terrestrial animals such as frogs, salamanders, lizards, iguanas and the like can be introduced into the upper tier modules 47 in columns A and B by removing the cover or dome 54 in either of columns A or B from the uppermost collar or connecting ring 11 and placing the animals into the upper tier modules 47 of columns A and B. Food for the animals within the upper tier modules 47 may be placed in any suitable place such as in horizontal connection member 45 or in an end cap 51. The animals within the upper tier modules 47 can drink water from a cup 48.

In operation, water is circulated throughout all of the lower tier modules 7 by way of the water circulation pump 66 which draws water from column A and pumps same through hollow hose 69 into the upper tier module 47 and lower tier module 7 of columns D, C, B and A. Oxygen is supplied to the water within the lower tier modules 7 by way of oxygen pump 72 and hollow hose 73 in communication therewith.

To change the water in the first embodiment of the invention as depicted in FIGS. 1–11 or to remove fish therefrom, the water is lowered in each lower tier module 7 by removing the cover or dome 54 from the uppermost collar or connecting ring 11 in column D and lowering the said cover or dome 54 with the hose 69 attached thereto to a level below pump 66, at which time water will flow totally from the lower tier module 7 in column A and from the lower tier modules 7 in columns B, C and D to a level approximately in alignment with the bottom of each horizontal, hollow connection member 45; at which time aquatic animals, such as fish, housed in the lower tier modules 7 are located in lower section 8 in each of columns B, C and D. A person can then separate one or more of the upper tier modules 47 from respective lower tier modules 7 by lifting the pertinent upper tier modules 47 and separating same from respective lower tier modules 7. Aquatic animals, such as fish, can be removed from the lower section 8 in columns B, C and D by removing a cap 60 or 75 and letting the aquatic animals escape with the water which will flow from such lower tier modules 7. To prevent possible shock to the aquatic animals when changing water, some of the water drained from the habitat might be used to blend with fresh water to be replaced within the habitat principally through the upper tier of the habitat.

Figure 12:
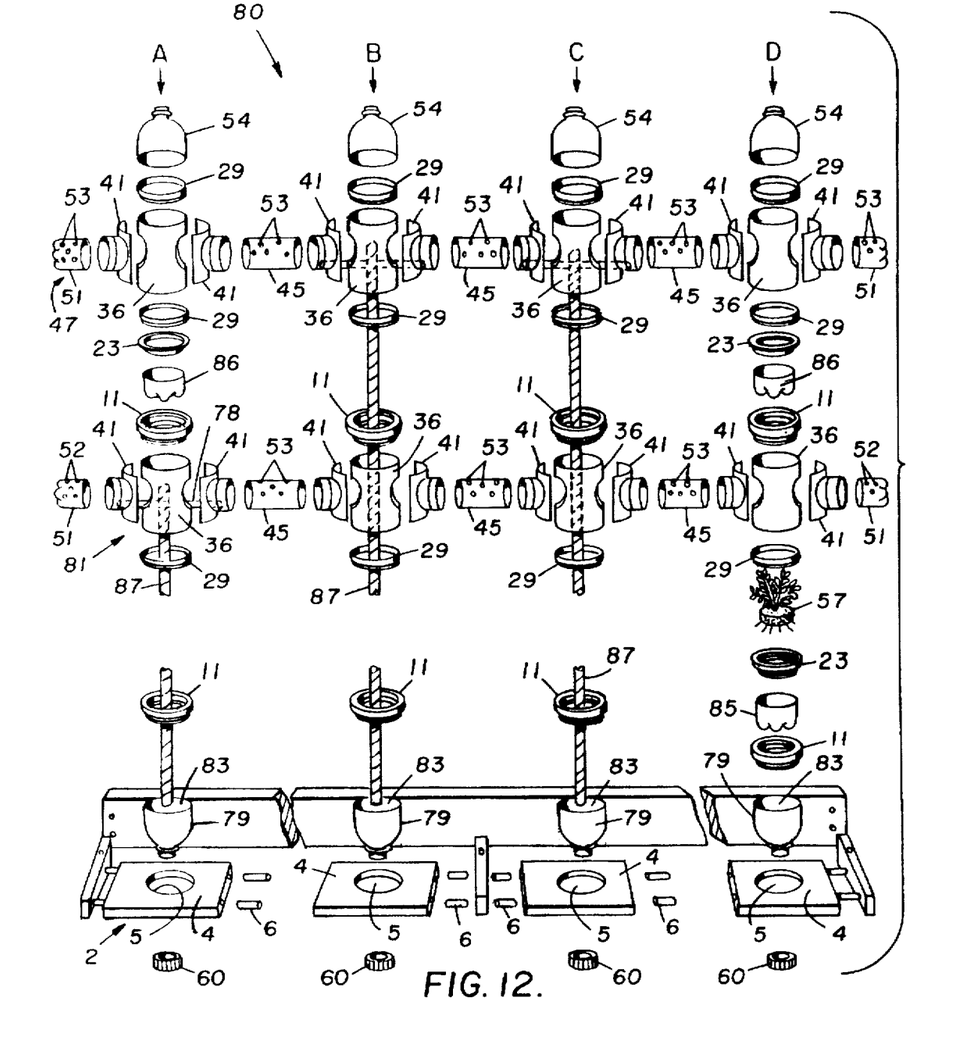
FIG. 12 is a front elevational, exploded, view of a second embodiment of the modular animal habitat of the present invention.
Figure 13:
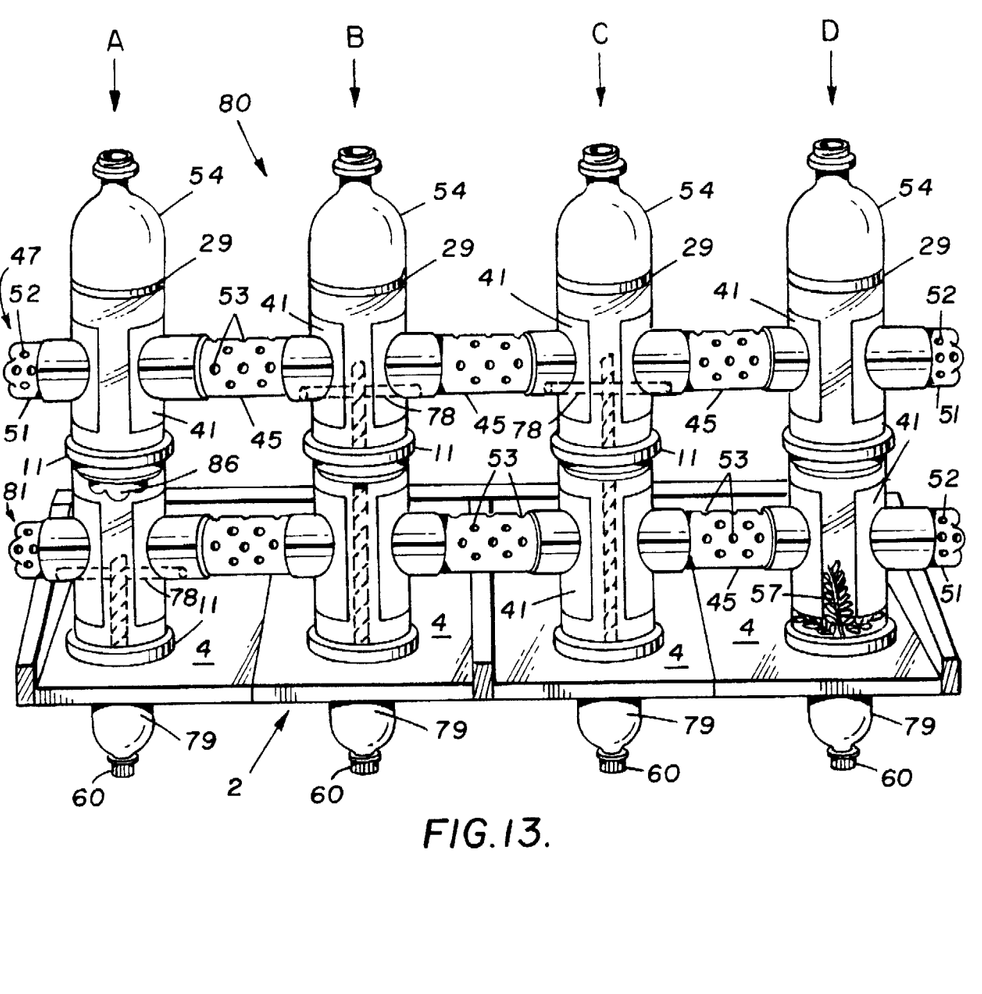
FIG. 13 is a front elevational view of the second embodiment of the modular animal habitat of FIG. 12.

The second embodiment of the animal habitat is depicted in FIGS. 12 and 13 and is generally designated with the reference numeral 80 with many of the parts being identical to and identified with the same reference numerals as are the parts in the first embodiment. The primary difference in the two embodiments of the present invention resides in the fact that both aquatic animals and terrestrial animals may be housed in the first embodiment whereas only terrestrial animals are housed in the second embodiment.

Referring now to FIGS. 12 and 13, modular animal habitat 80 generally comprises a rack or support 2, a plurality of lower tier modules 81, a plurality of upper tier modules 47; the lower tier modules 81 and the upper tier modules 47, as shown, being arranged in four vertical columns A, B, C and D.

Rack or support 2 includes a vertical back 3, a horizontal floor comprised of four sections 4, an opening 5 in each section 4 of the horizontal floor, and a plurality of dowel pins 6 for engaging openings (not shown) in the edges of the sections 4 of the floor for securing and connecting the floor.

As best shown in FIG. 12, each lower tier module 81 includes a lower section 79 having an upper opening 83, an externally threaded opening (not numbered) and an internally threaded cap 60, a collar or connecting ring 11 (FIG. 6); a reinforcing ring 29 (FIG. 4); a vertical main chamber 36 (FIG. 8); and a second collar or connecting ring 11 (FIG. 6). As best shown in FIG. 12, the lower tier module 81 in column D further includes an insert 23 (FIG. 5) for supporting a lower cup 85 for holding an artificial plant 57. As best shown in FIGS. 12 and 13, the lower tier module 81 in each of columns A and D includes an upper cup 86, one for holding food and the other for holding water for the animals housed therein.

As best shown in FIG. 12, each lower tier module 81 further includes a pair of generally arcuate-shaped vertical connection member 41; an end cap 51 with a plurality of upper openings 52 in each of columns A and D; a horizontal, hollow, connection member 45 having a plurality of upper openings 53 for connecting adjacent vertical connection members 41 between columns A and B, columns B and C, and columns C and D.

Each upper tier module 47 in columns A and D includes a pair of reinforcing rings 29; a vertical main chamber 36; a pair of vertical connection members 41; a cup 86 and a cover or dome 54. One of the cups 86 is for holding food and the other cup 86 is for holding water for the animals within the habitat. The upper tier module 47 in columns A and D has an end cap 51 having a plurality of openings 52 in its upper surface in communication with a vertical connection member 41. A horizontal connection member 45 having a plurality of openings 53 in its upper surface connects adjacent vertical connection members 41 of columns A and B, B and C and C and D. An end cap 51 having a plurality of openings 53 in its upper surface is in communication with the outermost vertical connection member 41 in columns A and D. The openings 52 and 53 are for allowing air to enter components in each of columns A–D for breathing purposes.

Each upper tier module 47 further includes a cover or dome 54 having a lower opening and an externally threaded upper opening. An internally threaded cap 60 (not shown in FIGS. 12 and 13, but identical to that shown in FIG. 2) is provided for mounting over the externally threaded opening 56 of cover or dome 54 in each of columns A, B, C and D.

A rope 87 is provided for passing through each of the upper and lower tier modules 47 and 81 in columns A, B and C to be climbed on by animals housed therein for exercise and for movements between upper and lower tier modules 47 and 81. While not shown, it is apparent that the upper end of each rope 87 must be anchored to a respective upper tier module 47. A stick, small log or the like 78 is placed generally horizontally in selected or all upper and lower tier modules 47 and 81 to allow animals housed therein to move within modules and between horizontally adjacent modules.

While the above description constitutes preferred embodiments of the present invention, it will be appreciated that the invention is susceptible to modification, variation and change without departing from the proper scope and fair meaning of the accompanying claims. For examples, the present invention might consist of only one tier of modules or might consist of a different plurality number of columns other than four; the electrical oxygen pump 72 might be eliminated from the first embodiment; and the covers or domes might be eliminated from the first embodiment; and the covers or domes might be eliminated in both embodiments of the invention particularly when housing non-crawlable animals. As is readily apparent, animals housed within the habitat might lay eggs and hatch babies within the habitat particularly in the lowermost portions of the lower tier modules.

I claim:

1. A modular habitat for housing animals, said habitat comprising:

a plurality of horizontally and adjacently disposed animal housings, each said animal housing including a cylindrical body having a chamber therein for receiving animals;

passage means respectively connected between said chambers of said animal housing, said passage means including an arcuate shaped member secured to each said cylindrical body, a first tubular member secured to and extending away from said arcuate shaped member, and, a second tubular member secured between adjacent said first tubular members to form a passageway between said adjacent chambers; and support means for supporting said animal housings.

2. The modular habitat as in claim 1 wherein each said chamber is a water receiving chamber and wherein the animals housed therein are of the aquatic type and further including means for causing the water to continuously flow through said chambers.

3. The modular habitat as in claim 2 wherein said means for causing water to continuously flow through said chambers also removes water from said chambers while retaining some water in at least one of said chambers for the aquatic animals when fresh water is to be added to said chambers.

4. A modular habitat for housing animals, said habitat comprising:

a first tier of a plurality of horizontally and adjacently disposed animal housings, each said animal housing having a chamber therein;

at least a second tier of a second plurality of horizontally and adjacently disposed animal housings, each said animal housing having a chamber therein;

first passage means respectively connected between said chambers of said first tiers of animal housings;

second passage means respectively connected between said chambers of said second tier of animal housings;

means for supportingly connecting selected ones of said first tier of said animal housings with selected ones of said at least a second tier of animals housings; and support means for supporting said first tier of animal housings.

5. The modular habitat as in claim 4 wherein each said animal housing includes a cylindrical body having a chamber for receiving said animals therein.

6. The modular habitat as in claim 5 wherein said first passage means includes an arcuate shaped member secured to each said cylindrical body, a first tubular member secured to and extending away from said arcuate shaped member, and, a second tubular member secured between adjacent said first tubular members to form a passageway between said adjacent chambers.

7. The modular habitat as in claim 6 wherein said second passage means includes an arcuate shaped member secured to each said cylindrical body, a first tubular member secured to and extending away from said arcuate shaped member, and a second tubular member secured between adjacent said tubular members to form a passageway between said adjacent chambers.

8. The modular habitat as in claim 7 wherein each said chamber of said housings in said first tier is a water receiving chamber and wherein the animals housed therein are of the aquatic type and further including means for causing the water to continuously flow through said chambers.

9. The modular habitat as in claim 8 wherein said means for causing water to continuously flow through said chambers also removes water from said chambers of said housings in said first tier while retaining some water in at least one of said chambers of said housings in said first tier for the aquatic animals when fresh water is to be added to said chambers.

10. The modular habitat as in claim 9 wherein at least one of said housings of said at least second tier of housings further includes a releasably attached cover and said means for causing water to flow through and being removed from said chambers of said housings in said first tier includes a hose having first and second ends, said first end being attached to said releasably attached cover and said second end being in communication with one of said chambers in said first tier of housings.

11. A modular habitat for housing animals, said habitat comprising:

a plurality of lower tier modules arranged generally horizontally and adjacent to each other;

first connecting passage means for horizontally connecting adjacent ones of said lower tier modules for allowing animals housed therein to move generally horizontally between said adjacent ones of said lower tier modules;

a plurality of upper tier modules arranged generally horizontally and adjacent to each other, selected ones of said upper tier modules being generally vertically disposed with respect to selected ones of said lower tier modules;

second connecting passages means for horizontally connecting selected ones of said adjacent ones of said upper tier modules for allowing animals housed therein to move generally horizontally between said adjacent ones of said upper tier modules;

means for connecting said selected ones of said lower tier modules to a respective selected one of said upper tier modules vertically disposed therewith; and means in engagement with each said lower tier module for supporting said lower tier modules.

12. The modular habitat as in claim 11 wherein each said module includes an animal housing assembly including a cylindrical body having a chamber for receiving said animals therein.

13. The modular habitat as in claim 12 wherein said first connecting passage means includes an arcuate shaped member secured to each said cylindrical body, a first tubular member secured to and extending away from said arcuate shaped member, and, a second tubular member secured between adjacent said first tubular members to form a passageway between said adjacent chambers.

14. The modular habitat as in claim 13 wherein said second connecting passage means includes an arcuate shaped member secured to each said cylindrical body, a first tubular member secured to and extending away from said arcuate shaped member, and a second tubular member secured between adjacent said tubular members to form a passageway between said adjacent chambers.

15. The modular habitat as in claim 14 wherein each said chamber of each of said housing assemblies in said lower tier modules is a water receiving chamber and wherein the animals housed therein are of the aquatic type and further including means for causing the water to continuously flow through said chambers and wherein the animals housed in each said chamber of each said housing assemblies in said upper tier modules are of the terrestrial type.

16. The modular habitat as in claim 15 wherein said means for causing water to flow through said chambers also removes water from said chambers of each of said housing assemblies in said lower tier modules while retaining some water in at least one of said chambers of said housing assemblies of said lower tier modules.

17. The modular habitat as in claim 16 wherein at least one of said housing assemblies of said upper tier modules further includes a releasably attached cover and said means for causing water to flow through and being removed from said chambers includes a hose having a first end and a second end, said first end being attached to said releasably attached cover and said second end being in communication with one of said chambers of said housing assemblies of said lower tier modules.

18. A modular habitat for housing animals, said habitat comprising:

a plurality of lower tier modules arranged generally horizontally and adjacent to each other, each lower tier module including a lower section, a vertically extending main chamber, and means for securing said lower section to said main chamber;

means for connecting each said main chamber of adjacent said lower tier modules for providing a passageway between said adjacent lower tier modules for allowing animals housed therein to move generally laterally between said lower tier modules;

a plurality of upper tier modules arranged generally horizontally and adjacent to each other, each upper tier module including a vertically extending main chamber, and means for securing said main chamber of a selected one said lower tier module to a selected one of said upper tier modules;

means for connecting at least two of said main chambers of said upper tier modules for providing a passageway between said at least two main chambers of said upper tier modules for allowing animals housed therein to move generally laterally between said at least two main chambers of said upper tier modules; and means for supporting said lower tier modules.

19. The modular habitat of claim 18 wherein said main chamber in each said lower tier module is cylindrical and said means for connecting each said main chamber of adjacent said lower tier modules includes an arcuate shaped member secured to each said cylindrical main chamber, a first tubular member secured to and extending away from said arcuate shaped member, and, a second tubular member secured to and between adjacent said first tubular members to form said passageway between said adjacent main chambers to allow animals housed therein to move between said adjacent main chambers.

20. The modular habitat of claim 19 wherein said main chamber in each said upper tier modules is cylindrical and said means for connecting each said main chamber of said at least two main chambers of said upper tier modules includes an arcuate shaped member secured to each said at least two cylindrical main chambers, a first tubular member secured to and extending away from said arcuate shaped member, and, a second tubular member secured to and between said adjacent first tubular members to form said passageway between said at least two main chambers to allow animals to move between said at least two main chambers to allow animals housed therein to move between said at least two main chambers.

21. The modular habitat of claim 20 wherein said second tubular member includes a plurality of openings in its upper surface for allowing air to enter said second tubular member.

22. The modular habitat as in claim 21 wherein each said main chamber of each said lower tier module is a water receiving chamber and wherein the animals housed therein are of the aquatic type and further including means for causing the water to continuously flow through said chambers.

23. The modular habitat as in claim 22 further including means for removing water from said chambers while retaining some water in at least one of said chambers for the aquatic animals when fresh water is to be added to said chambers.

* * * * *